Patented July 26, 1938

2,124,782

UNITED STATES PATENT OFFICE 2,124,782

INSECTICIDAL OIL SPRAY

Hugh Knight, Claremont, Calif., assignor, by mesne assignments, to Emulsoids, Inc., San Francisco, Calif., a corporation of Delaware No Drawing. Application September 15, 1933, Serial No. 689,562

4 Claims. (Cl. 167—43)

This invention relates to an insecticidal oil spray, and it pertains more particularly to means whereby oil may be rendered effective against plant parasites, such as scale, aphids, coddling moth, green and red mites, red spider, leafhoppers, mealybugs, thrips, Oriental peach moth, pear psylla, etc., without being absorbed by the leaf surfaces on which it is sprayed and without injury to sensitive foliage. The invention relates chiefly to the regulation of oil penetration into plants, leaves or fruits and to the regulation of oil film thickness, permanence of oil film, and the ability of the oil to kill parasites without being absorbed by the plant.

The effectiveness of oil as an insecticide has long been known. Attempts have been made to prevent plant injury by reguating oil viscosities, gravities, volatilities, concentrations and degrees of refinement, but all of these attempts have failed. Volatile oils, such as kerosene, are not effective in small concentrations because they disappear too rapidly, both by vaporization and by absorption into plant leaves. If used in larger concentrations, light volatile oils cause leaf burn and numerous other plant injuries. For a time it was thought that highly treated viscous oils such as white oils could be used with safety on foliage, but it was found that much of the deleterious action of oil on foliage was physical rather than chemical and that the percent of "unsulfonatable residue", etc. was not the only measure of plant safety.

The injury caused by oil appears to be chiefly physical in nature and it is due to either (1) suffocation of the leaf due to interference with plant respiration or (2) a metabolic disturbance in the plant caused by oil penetration which interferes with the synthesis of starch in the leaves and which prevents translocation of synthesized starch from the leaf to the other parts of the plant. The object of my invention is to prevent the penetration of oil into leaves or plant structure so that these functional disturbances will be avoided and at the same time to maintain an oil film on the surface of the leaf for a sufficient period of time to kill plant parasites and for an insufficient period of time to cause plant suffocation. In other words, the object of my invention is to regulate the penetration of oils into leaves and at the same time to regulate the deposit and persistence of the oil film on the leaf in such a manner that the oil will be effective as an insecticide and non-injurious to the plant.

In the application of oil spray emulsions three factors are of importance,—(1) the interfacial tension between oil and water, (2) the interfacial tension between the oil and the leaf after the water has evaporated, and (3) the tendency of the oil to penetrate the leaf. My invention plays an important part in (1) because it assures intimate dipersion of the oil in water and makes it possible to regulate the amount of oil that can be deposited at any concentration without sacrificing coverage,—makes it possible to reduce the film thickness of heavy oil and to increase film thickness of light oil. My invention plays an important part in (2) because it apparently releases the oil on the plant leaves, insures a thorough, even coverage, and makes it possible to regulate film thickness of these oils on leaves after the water is evaporated. My invention plays what is probably its most important role in (3) because it prevents both light and heavy oils from penetrating the plant structure, at least to an appreciable extent.

I have discovered that the deposit of oil on plant leaves may be readily controlled and regulated by the use of two complementary reagents which may be referred to as a "solubilizer" agent and an "oil-releasing" agent.

The solubilizer agent may be defined as a neutral oil-soluble composition, such as glyceryl or glycol naphthenate or oleate and it is characterized by its action in reducing the interfacial tension between oil and water, in tending toward the formation of stable emulsions with water, and in retarding penetration of oil into plant leaves.

The "oil-releasing" agent is also an oil-soluble composition and it contains a bivalent or trivalent cation combined with a naphthenic acid radical, this agent being characterized by its tendency to increase the viscosity of the oil, to release the oil from the water when it comes in contact with the plant leaf, and to prevent penetration of oil to the plant leaf.

Briefly, the effect and function of the two ingredients which I combine with oil in the penetration of my improved tree sprays may be ascertained from the following table:

|  | Effect on— | | |
|---|---|---|---|
|  | Oil | Emulsion | Plant |
| *Solubilizing agent* <br> Glyceryl oleate, glyceryl naphthenate, etc. | Alters effect of oil-releasing agent on viscosity. | Stabilizer; acts as an emulsifier. | Retards penetration. |
| *Oil-releasing agent* <br> Aluminum naphthenate | Increases viscosity. | Inverts: releases oil; makes emulsion "quick breaking." | Effects coverage; maximum oil deposit; retards penetration. |

I have discovered that aluminum naphthenate has the unexpected property of preventing the penetration of the oil into plant leaves and it tends toward the formation of thicker oil films with very light oils. Since this agent also acts as an invert emulsifier it releases the oil from the water when the spray hits a leaf, and besides bringing about the "quick-breaking" of the emulsion it increases the tendency of the oil to stick to the leaf, to spread over the leaf, and to remain on the leaf for a sufficient period of time to give protection against parasites.

The solubilizer agent is preferably glyceryl oleate or glyceryl naphthenate, which act as powerful emulsifying agents because of their effect on the surface tension characteristics of the oil. The remarkable effect of these agents on the surface tension characteristics of the oil may be shown by tests using the Donnan drop-pipette method, substituting distilled water as a standard and allowing a major quantity of the same to drop from the tip of the pipette while immersed in the oil to be tested. When 10 cc. of water is dropped into a white oil of 44 seconds Saybolt viscosity at 100° F., the drop number is 45; when 1% of glyceryl oleate is dissolved in the oil the drop number is increased to 200. Glyceryl naphthenate accomplishes even better results and has the added advantage of being unaffected by hard water. Also, the glyceryl oleate tends to modify the jelling power of the aluminum naphthenate; when 1% of glyceryl oleate was added to the 5% of aluminum naphthenate solution in kerosene under the conditions hereinabove referred to, it required only 90 seconds to discharge 40 cc. of the solution through a burette; and when 2% glyceryl oleate was added to the 5% aluminum naphthenate solution the viscosity was lowered to 76 seconds. The solubilizing agent, then, not only tends toward the formation of stable emulsions but it modifies the jelling power of the aluminum naphthenate.

The oil ingredient of my improved spray is preferably a white oil of relatively low viscosity. In other words, it is a petroleum distillate ranging in viscosity from about 40 to 90 seconds Saybolt at 100° F. and having an unsulfonatable residue of about 80 to 100%. It should be understood, however, that I may use oils of lower viscosity due to the fact that the jelling power of aluminum naphthenate increases the effective viscosity of the oil. I may employ a less highly refined oil because of the fact that both my solubilizing agent and my oil-releasing agent cooperate in preventing the penetration of the oil into the plant leaf and therefore protect the plant against impurities in the oil. I may employ oils of higher viscosity than 90 seconds Saybolt at 100° F., as high as 110–120 seconds, since my solubilizer agent insures equal distribution of the oil on the leaf and the oil-releasing agent insures the deposit of the oil thereon. Excellent results have been obtained from field tests using "Acme white oil" which has a viscosity of 80 seconds Saybolt at 100° F., a color of 16 to 18 Saybolt, and an unsulfonatable residue of not less than 95%.

A spray of this oil was used against the pear Psylla in Michigan, using the following approximate formula:

| | Per cent | | Per cent |
|---|---|---|---|
| Water | 98 | | |
| Oil phase | 2 | Acme white oil | 96 |
| | | Aluminum naphthenate | 3 |
| | | Glyceryl oleate | 1 |

The oil phase usually contains about 1 to 10%, preferably 5%, of mixed solubilizing and oil-releasing agents and I have found that under these particular conditions optimum results are obtained by employing about three parts of the oil-releasing agent to one part of the solubilizing agent. A small amount of water (just enough to reach the agitators) is put in the spray tank. Circulation and agitation is set up by a motor-driven pump, water being withdrawn from the base and injected into the upper part of the tank. The oil is then poured into the tank and circulation and agitation is continued until emulsification is complete,—this only requires a few minutes. The rest of the water is then added and the circulation or mechanical mixing is continued until the oil is thoroughly emulsified in the entire volume of water. Agitation of the emulsion should be continued during its application.

It is important in obtaining the proper oil deposit on the leaf that the emulsion be "quick-breaking" and the characteristics of the emulsion will naturally depend somewhat on the water which is used. A quick-breaking emulsion is one that, from a given quantity of an emulsion containing a certain percent of oil will deposit the greatest quantity of oil per unit area on a sprayed surface. Increasing stability means the deposition of less and less oil on the sprayed surface. An outstanding feature of my invention is the fact that I can easily obtain a quick-breaking emulsion by slightly varying the proportions of solubilizing agent to oil-releasing agent; if the emulsion is too stable I add a small amount of aluminum naphthenate or the like and if the oil is not properly emulsified I add a small amount of glyceryl oleate or naphthenate. The proportions of these materials should be so regulated that free oil will begin to separate out in an upper layer or "cream" in less than five minutes in the absence of agitation.

The oil spray hereinabove described (2% emulsion of Acme white oil containing about 4 or 5% of a mixture of three parts glyceryl naphthenate with one part of glyceryl oleate) has given remarkable results on citrus trees in California and on apple and pear trees in Michigan. The outstanding feature of the spray is its facility for releasing the oil on leaf surfaces and preventing the penetration of this oil into the plant leaf. Oil deposited by soap emulsifiers rapidly disappear from the leaf, not by evaporation but by being absorbed into the leaf. This causes suffocation of the plant leaf due to interference with plant respiration and it causes metabolic disturbances which interfere with the synthesis of starch in the leaves and which prevents the translocation of synthesized starch from the leaf to other parts of the plant. My improved emulsion minimizes the penetration of oil into the leaves because of the peculiar effect of both the solubilized agent and the oil-releasing agent. While this theory may not be absolutely correct the fact remains the same that my improved emulsion has given practically 100% control against pear Psylla in a heavily infested Michigan orchard where the best commercially feasible sprays heretofore known gave greatly inferior results. It has also proved itself superior to the best prior art sprays against coddling moth in heavily infested apple orchards. In all cases the remarkable results obtained are apparently due to the unusually complete deposition of oil on the leaf surface, the complete coverage obtained, the persistence of the oil on the surface of both the leaves and the fruit and the prevention of oil penetration.

The aluminum naphthenate is preferably prepared from a highly purified naphthenic acid stock in the manner described in Bransky, United States Patent 1,681,657. Some naphthenic acids, particularly from Russian and Roumanian petroleum distillates, are composed chiefly of compounds ranging from $C_6H_{11}COOH$ to $C_9H_{17}COOH$. They are probably substituted carboxylic cyclopentanes, such as 1-methyl cyclopentane-2-carboxylic acid, or polycarboxylic acids of cyclopentane or methyl cyclopentane. They may, however, be hexahydro benzoic acids or other carboxylic acid compounds of cyclic polymethylene hydrocarbons. As above stated, I prefer to use aluminum naphthenate but I may employ magnesium, iron, or other polyvalent cations. I have found that copper naphthenate may be employed in amounts as high as 1% based on oil and that copper naphthenate offers the additional advantage of being a powerful fungicide.

The glycerol or glycol oleate or naphthenate which are my preferred examples of solubilizing agents are preferably only partially esterified. The commercial glyceryl oleate, for example, may contain large amounts of glyceryl trioleate and other fats and/or fatty acids, but it should contain a considerable amount of mono and/or dioleate. I prefer to employ solubilizing agents characterized by free OH groups because I have a theory that free OH groups have a marked effect in preventing the penetration of oil into the plant leaves.

In my preferred embodiment I have described the use of 2% emulsion of Acme white oil. In many cases it will be more advantageous to employ a lighter oil, since the effective viscosity is increased by the aluminum naphthenate. Also, it may be desirable to employ a lower oil concentration, especially where the foliage or trees are subject to a hot arid climate. Leaf burn may be produced by a 2% oil emulsion applied in hot weather even though the oil does not penetrate the leaf, and in many instances it is therefore desirable to employ oil concentrations ranging from 1 to 1¾%. In order to insure insecticidal effectiveness of the lower oil concentrations I have found that oil soluble poisons may be effectively used. Nicotine may be used because it is rendered more oil-soluble by my solubilizing agent. It is not nearly as effective, however, as oil soluble nicotine compounds, such as nicotine oleate, linoleate and salicylate. Nicotine salicylate has been found to be remarkably effective,—much more effective than nicotine sulfate and other poisons which have heretofore been tested in oil sprays. These new nicotine compounds are remarkably effective in white oils no matter how they are applied to the leaves, but when they are incorporated in my improved emulsion with the solubilizer and oil-releasing agents, they cooperate with these agents to still further increase the effectiveness of the control and the safety from plant injury.

While I have described in detail a preferred embodiment of my invention and have set forth the features of the invention clearly and concisely as required by the statutes, it should be understood that I do not limit myself to any of the details hereinabove set forth except as defined by the following claims.

I claim:

1. An anti-parasitic oil composition for application in emulsified form to sensitive foliage which comprises a refined petroleum white oil containing in solution about 5% of a mixture of about three parts by weight of aluminum naphthenate and one part by weight of glyceryl oleate.

2. A spray emulsion which comprises an aqueous emulsion containing about one to two percent of an oil composition in the form of a quick-breaking emulsion, the oil phase containing about 5% of a mixture of about three parts by weight of aluminum naphthenate to one part by weight of glyceryl oleate.

3. An antiparasitic oil spray for application in emulsified form to sensitive foliage, which comprises a mineral oil of about 40 to 90 seconds Saybolt viscosity at 100° F. containing about 1 to 5% of a mixture of solubilizing and oil-releasing agents, the amount of oil-releasing agent being in excess of the amount of the oil-solubilizing agent, the oil-solubilizing agent consisting essentially of a polyhydroxy ester of a high molecular weight organic acid and the oil-releasing agent consisting essentially of an oil-soluble aluminum soap of naphthenic acid.

4. An antiparasitic oil spray for application to sensitive foliage, which comprises a mineral oil of about 40 to 90 seconds Saybolt viscosity at 100° F. and an unsulfonatable residue of between 80 and 100% containing about 1 to 5% of a mixture of solubilizing and oil-releasing agents, the amount of oil-releasing agent being in excess of the amount of the oil-solubilizing agent, the oil-solubilizing agent consisting essentially of a polyhydroxy ester of a high molecular weight organic acid and the oil-releasing agent consisting essentially of an oil-soluble aluminum soap of naphthenic acid.

HUGH KNIGHT.